United States Patent
Haycock

(10) Patent No.: US 6,697,511 B1
(45) Date of Patent: *Feb. 24, 2004

(54) PARTIAL READ CONFIRMATION METHOD

(75) Inventor: Richard Glen Haycock, Coblham (GB)

(73) Assignee: Currency Systems International, Irvining, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/223,994

(22) Filed: Aug. 20, 2002

Related U.S. Application Data

(63) Continuation of application No. 09/311,322, filed on May 13, 1999, now Pat. No. 6,510,238.

(51) Int. Cl.$^7$ ............................. G06K 9/00; G06F 17/60
(52) U.S. Cl. ........................................ 382/135; 705/43
(58) Field of Search ................. 382/135, 140, 382/229–31, 137, 105; 705/43; 235/379; 902/11, 12, 14, 17; 209/534

(56) References Cited

U.S. PATENT DOCUMENTS

| | | | | |
|---|---|---|---|---|
| 3,782,543 A | | 1/1974 | Martelli et al. | |
| 3,916,194 A | | 10/1975 | Novak et al. | |
| 4,139,219 A | * | 2/1979 | Herndon | 283/57 |
| 4,264,808 A | | 4/1981 | Cwens et al. | |
| 4,315,246 A | * | 2/1982 | Milford | 382/140 |
| 4,418,423 A | * | 11/1983 | Tsuji et al. | 382/225 |
| 4,587,434 A | | 5/1986 | Roes et al. | |
| 4,991,008 A | | 2/1991 | Nama | |
| 5,099,423 A | | 3/1992 | Graef et al. | |
| 5,105,364 A | * | 4/1992 | Kawamura et al. | 700/219 |
| 5,478,992 A | * | 12/1995 | Hamada et al. | 235/379 |
| 5,545,885 A | | 8/1996 | Jagielinski | |
| 5,570,465 A | * | 10/1996 | Tsakanikas | 358/1.15 |
| 5,615,280 A | * | 3/1997 | Izawa et al. | 382/135 |
| 5,692,067 A | | 11/1997 | Raterman et al. | |
| 5,917,930 A | * | 6/1999 | Kayani et al. | 382/135 |
| 6,015,087 A | * | 1/2000 | Seifert et al. | 235/379 |
| 6,122,402 A | * | 9/2000 | Arai et al. | 382/232 |
| 6,185,338 B1 | * | 2/2001 | Nakamura | 382/229 |
| 6,339,651 B1 | * | 1/2002 | Tian et al. | 382/105 |
| 6,510,238 B2 | * | 1/2003 | Haycock | 382/135 |

FOREIGN PATENT DOCUMENTS

| | | | | |
|---|---|---|---|---|
| JP | 57085179 | * | 5/1982 | G06K/9/62 |
| JP | 62251987 | * | 4/1986 | G06K/9/03 |
| JP | 01096779 A | * | 4/1989 | G06K/9/72 |
| JP | 04023185 | * | 1/1992 | G06K/9/36 |

* cited by examiner

*Primary Examiner*—Amelia M. Au
*Assistant Examiner*—Martin Miller
(74) *Attorney, Agent, or Firm*—Colin P. Cahoon; Carstens, Yee & Cahoon, LLP

(57) ABSTRACT

Methods for identifying a note with a partial OCR of one or more characters in the note's serial code. The methods record the characters read and associates each character read with its field position in the serial code. The method can use this information or combine the character and field information with positional information of the note within a stack in order to identify a note with a reasonable degree of statistical probability.

12 Claims, 3 Drawing Sheets

PARTIAL READ CONFIRMATION METHOD

This is a continuation of Application No. 09/311,322, now U.S. Pat. No. 6,510,238, filed May 13, 1999.

BACKGROUND OF THE INVENTION

1. Technical Field

The present invention relates to methods for identifying a currency note using a partial read of the note's serial number or code. Individual numbers are identified to specific fields in the serial number in order to provide a statistically accurate identification of a note despite an inability to read the entire serial number.

2. Description of Related Art

Optical character recognition ("OCR") is a technology commonly used in the currency processing field for lifting the serial number or code from processed notes. OCR technology is used, for example, for identifying specific notes processed by a high speed currency processing machine, such as those machines manufactured and marketed by Currency Systems International of Irving, Tex., by lifting a note's serial code using a camera device and then recording the serial code to the note processed.

By way of example, a stack of currency can be fed into the high speed currency processing machine. As one of the functions of the machine, an OCR device reads the serial number or code of notes passed through the machine for processing. These serial numbers can be recorded and identified to specific notes as they are processed. One of the functions of the high speed currency processor may be to sort currency by denomination and stack fit notes for bundling. As the fit notes are stacked, the data processing capabilities of the currency processing machine track the location in the stack of each currency note by serial number. For example, for a processed stack or bundle of one hundred notes in twenty dollar denominations, data is accumulated that will indicate the specific serial number on each note in the stack or bundle and position of each note in the stack.

This information can be particularly useful in a number of potential applications. For example, if this bundle is later distributed by an automatic teller machine ("ATM"), the ATM can identify the specific notes distributed to a specific account by recording the position of the notes in the stack as they are distributed. The ATM might record that the eighth note in the stack was distributed to a specific account holder on a specific day and time. If later that particular account holder contacts the bank to indicate that the account holder received a counterfeit note, the bank can confirm such claim by requesting that the account holder identify the serial number of the note in question. The bank will be able to tell which note was distributed to the account holder if it knows the position of the note in the bundle and the serial number recorded for the note at that position provided by the high speed currency processing machine. If the serial number provided by the account holder matches the serial number identified to the note distributed, then the bank has confirmed that a counterfeit note was in fact distributed to the account holder.

Another example of a potential application of OCR technology is to assist in the identity of missing notes. For example, a commercial institution might transfer bundles of notes to a central bank in groupings of one hundred notes per bundle. If the central bank determines that there are only ninety-nine notes in a bundle that should have contained one hundred, it is extremely useful to be able to identify the serial number of the ninety-nine notes that were received and compare that data with the serial numbers recorded by the commercial institution to the one hundred notes that it shipped. By identifying the serial number of the missing note, it may be possible to identify the location of the note in the bundle and determine if there had been a problem at some stage of note processing.

Another example of a potential use of OCR technology involves notes deposited from a till when the till depositor later claims that the depositee did not properly credit all the notes deposited. If the till depositor can identify the serial numbers of each note deposited, the accounting problem might be more easily resolved.

While there are many potentially useful applications incorporating the ability of OCR devices to identify a note's serial number, unfortunately a consistently accurate read of the entire field of every note's serial number in a high speed currency processing environment is not feasible given present OCR technology. This difficulty increases with worn or unfit notes. Consequently, it is not uncommon for OCR devices to obtain only a partial read of a note's serial number. The fact that extremely worn or soiled notes will always need to be processed along with more fit notes makes it unlikely that any improvement in OCR technology will ever provide the capability of a one hundred percent accuracy rate in reading the entire field of every note processed. Presently, none of the above examples of useful applications of OCR technology can be reliably applied in light of the inability to read the entire serial code of every note processed.

Consequently, a need exists for a method that will accurately identify a note even though the note's entire serial number could not be obtained by OCR technology. This method should provide positive note identification or negative note discrimination even though only a portion of the OCR is successful. Such a method should be capable of identifying notes through a high level of statistical probability having read only two or more of the identifying fields and should be able to provide some level of discrimination when even only one field is read.

SUMMARY OF INVENTION

The invention involves methods for identifying a currency note when not all fields of the serial number or code of a note have been read. This is accomplished by recording the position of each field read along with the character identifier found in that field. The method can also combine this information with the position of the note in a specific stack of currency to provide an additional data point.

By way of example, United States currency notes, such as the one illustrated in FIG. 1, generally have serial numbers with ten fields. An OCR lift on a soiled or worn note might only identify one or two characters of the serial number accurately. However, because the field position of each character read on the note can also be identified, the method can determine which fields have been read and then associate the character within each field to the field position. The method then uses this information in order to statistically identify a serial number of a note to the note processed. This information can also be combined with the position of the note in the currency stack. By knowing a small percentage of the characters associated with a specific serial number, the respective field position of each character, and the position of the note in a stack, notes can be identified with a high statistical probability of accuracy. This method, therefore, greatly enhances the usefulness of OCR technology without the necessity of improving on the accuracy of OCR devices.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as preferred mode of use, further objectives and advantages thereof, will be best understood by reference to the following detailed description of illustrative embodiments when read in conjunction with the accompanying drawings, wherein:

DETAILED DESCRIPTION

Figure 1:
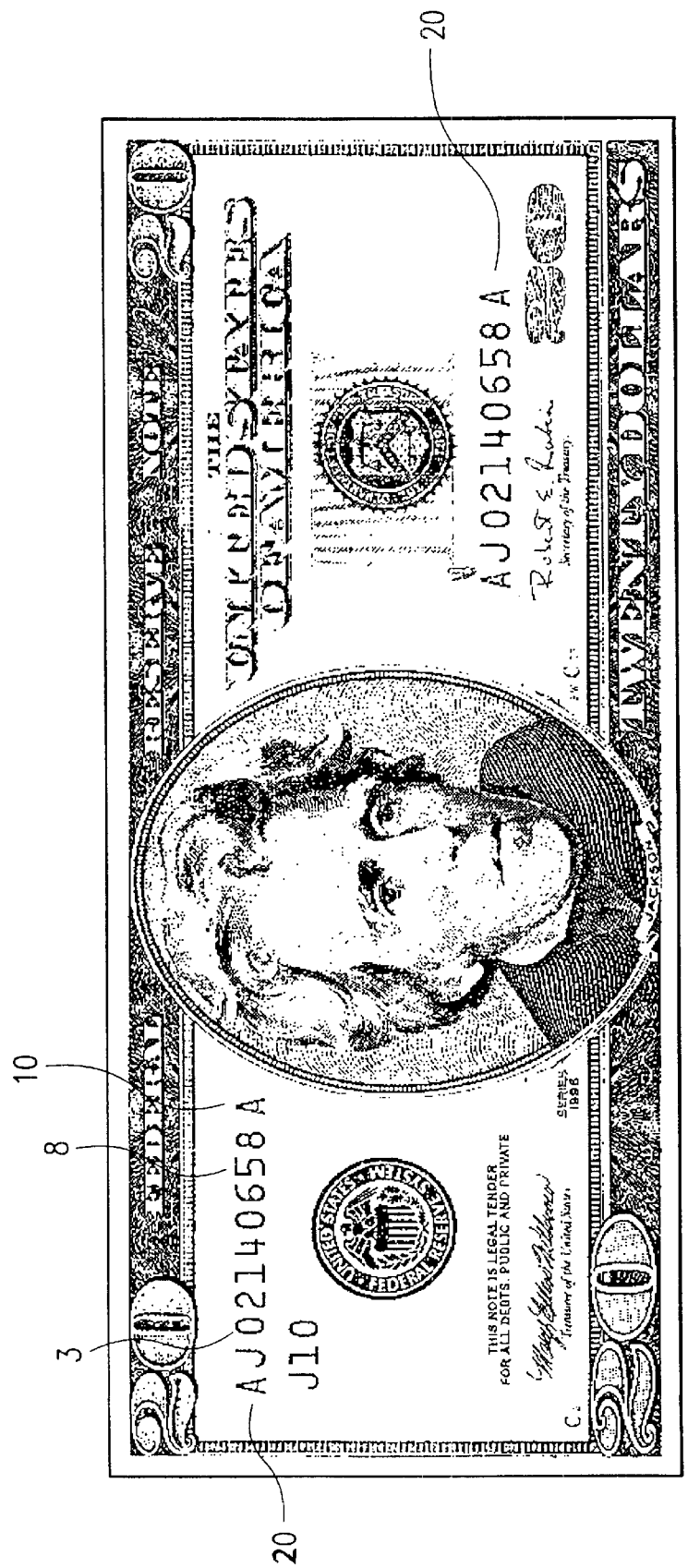
FIG. 1 is an illustration of a note.

FIG. 1 illustrates a typical twenty dollar bill or note. FIG. 1 shows identical serial codes 20 located in the upper left and lower right hand corners of the note. This code 20 can consist of combinations of number and/or letters. Also identified for illustrative purposes are the third 3, eighth 8, and tenth 10 fields in the serial code 20.

Currency processing machines presently use one or more OCR devices in order to read one or both of the identical serial codes 20. Because of soiling on the note or damage to the note, it may not be possible for even the most accurate OCR devices to read the entire serial code for a specific note. For illustration of the method involved, it is assumed that the note shown in FIG. 1 was soiled or damaged to the point that only the characters in the third 3, eighth 8, and tenth 10 fields of the serial code 20 can be read. In this instance the characters "0," "5," and "A," respectively. The information that these three characters provide in and of themselves is of limited value. It would be difficult to identify any note knowing only that the characters "0," "5," and "A" appeared somewhere in a ten field serial code.

An OCR device (in combination with sensors that identify the position of the note relative to the OCR device) is capable, however, of determining the field position of each character read, because the serial code is located in the same relative position on a note. Therefore, additional information can be provided along with the characters read. Using the note example illustrated in FIG. 1, data can be recorded indicating that the number "0" was found in the third field 3 of the serial code, that the number "5" was found in the eighth field 8 of the serial code, and that the letter "A" was found in the tenth field 10 of the serial code.

Assuming that the numbers zero through nine are available for each of the fields displaying numbers 3, 8, and that all twenty-six letters of the alphabet are available for the fields displaying letter characters 10, only one in two thousand six hundred notes would have the number zero in the third field 3, the number five in the eighth field 8, and the letter "B" in the tenth field 10. Consequently, by knowing just three characters and their position in the serial code 20, a note can be positively identified to a full serial code string with a 99.96% accuracy rate. Conversely, in attempting to negatively discriminate between a known serial code and the example note in FIG. 1, the probability of a note having the same three characters read in the same three field positions is less than 0.04%. Even when only two field positions are read, for example the eighth field 8 and the tenth field 10, the ability to negatively discriminate between a partial read serial code is still statistically significant. For example, if an account holder withdrew a note from an ATM and later called the bank to indicate that such note was a counterfeit, the account holder would have less than 0.4% chance of guessing at the accurate serial code when the bank knows that the number five and the letter "A" are found in the eighth 8 and tenth 10 fields, respectively.

One embodiment of the invention uses only the combination of characters read along with their respective field positions to assist in identifying or negatively discriminating notes. A second embodiment of the invention adds to this information the position of the note in question in a given currency bundle or stack. Again using the example note of FIG. 1, it is assumed that the information has already been provided on the characters found in three field positions. During currency processing, it can also be recorded that the note identified to this partial read serial code has been placed, for example, as the eight note in a bundle of one hundred notes. Likewise, all of the notes in a particular stack are associated with either complete or partial serial code information obtained during processing and positional information in the stack. This process can be assimilated by a computer or the data processing functions of the currency processing machine.

The benefit of knowing the position of the note in the stack is again illustrated by the example involving the ATM. The ATM can typically identify and record the position of each note withdrawn and associate that note's position with each specific withdrawal. Further, the ATM can record the account information associated with such withdrawal. Consequently, if an account holder contacts the bank complaining that a counterfeit had been distributed from one of the bank's ATM, using applicants method the bank would be equipped with all the information required to determine if this claim is valid even though only a partial serial code read has been obtained on the note in question.

The bank first requests the account holder's account number and the date and location of 10 the ATM withdrawal. Using this information, the bank can determine the position in the stack loaded in the ATM of the notes withdrawn by the account holder. A simple example involves an account holder that withdrew one single note which the bank identifies as the example note of FIG. 1 and where this is the note recorded to the eighth position in a stack of one hundred notes loaded into the ATM. To confirm that the note is a counterfeit, the bank then requests that the account holder provide the serial number of the note. The statistical probability that any given note will have the same three characters identified to their respective three fields 3, 8, 10, as the note that was identified as being distributed by its location in the stack is one in two thousand six hundred, or less than a 0.04% chance.

Figure 2A:
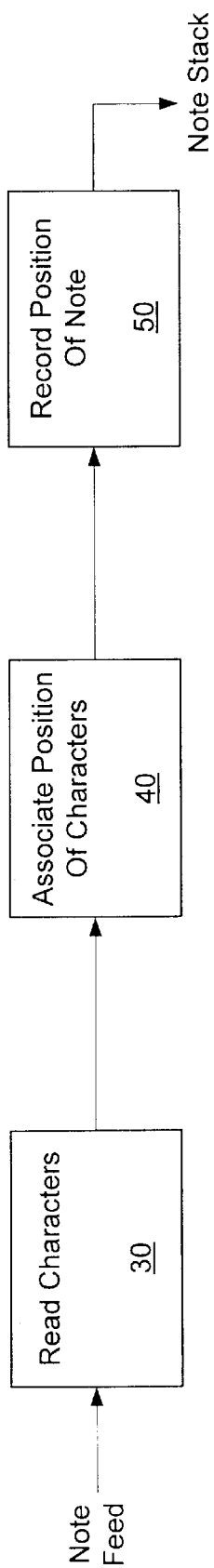
FIGS. 2a and 2b are flow charts showing the steps of one of the methods disclosed.
Figure 2B:
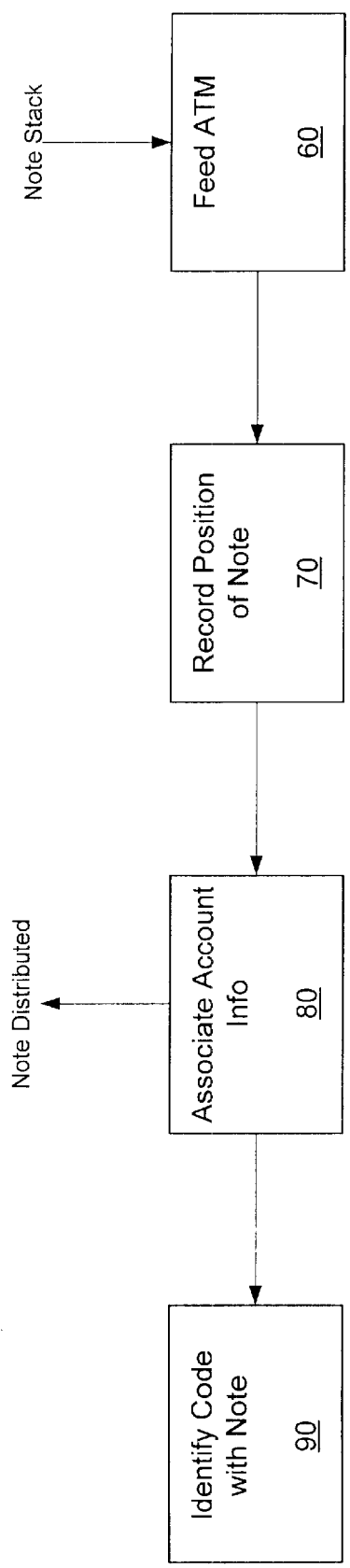

The steps of the above method are further understood by reference to FIGS. 2a and 2b. A bundle of unprocessed notes are fed into a processing device, such as a high speed currency processing machine. During the processing cycle, an OCR device reads 30 the serial code of all identifiable characters on each note as it passes the device. Next, the position of each character read is associated 40 with a known field position. This information is retained by a computer or separate data processing function while the note is further processed. At the end of the processing cycle each note is stacked with other processed notes in a bundle. A record 50 is made of the position of each note in the bundle. All of the information obtained during the steps illustrated by FIG. 2a is correlated for each of the individual notes processed.

Later, the note stack or bundle is fed 60 into an ATM. As each individual note is subsequently distributed, the ATM records 70 the position of the note from the stack as it is distributed. The ATM also associates 80 account information regarding the account holder to whom the note from a said position is distributed. By knowing this account information, the bank can use the positional information to identify 90 a partially read serial code to each individual note distributed.

The invention has applications beyond OCR lift and high speed currency processing issues.

For example, OCR devices could be installed to record serial numbers on notes as they are being distributed from an ATM or other consumer currency distribution type machines. Identification of serial code information, even if it is only a partial read of the serial code, could then be associated by the ATM machine with each individual withdrawal. Using the method described of recording not just the characters found by the partial read but also the characters position in the serial code, a bank would be able to identify each note distributed to a reasonable degree of statistical probability even without knowing the position of the note in the bundle loaded into the ATM.

While the invention has been particularly shown and described with reference to a preferred embodiment, it will be understood by those skilled in the art that various changes in form and detail may be made therein without departing from the spirit and scope of the invention.

What is claimed is:

1. A method for identifying a note having a serial code, said method comprising the steps of:
   (a) reading at least one character of the note's serial code from a scanned image of the note;
   (b) identifying the field position of said at least one character read;
   (c) responsive to a determination that at least one character other than said at least one readable character of said serial code cannot be read, identifying the note by using the at least one readable character and the respective field position of said at least one readable character, wherein the position of the at least one readable character is not known prior to reading the at least one readable character; and
   (d) identifying the note to a position in a stack of notes.

2. The method of claim 1 wherein the serial code characters are identified using an optical character recognition device.

3. A method for identifying a note having a serial code, said method comprising the steps of:
   (a) reading at least one character of the note's serial code from a scanned image of the note;
   (b) identifying the field position of said at least one character read; and
   (c) responsive to a determination that at least one character other than said at least one readable character of said serial code cannot be read, identifying the note by using the at least one readable character and the respective field position of said at least one readable character, wherein the position of the at least one readable character is not known prior to reading the at least one readable character, and
   wherein the position is correlated to account information when the note is distributed.

4. The method of claim 3 wherein the serial code characters are identified using an optical character recognition device.

5. A method for identifying a note having a serial code, said method comprising the steps of:
   (a) reading at least one character of the note's serial code from a scanned image of the note;
   (b) identifying the field position of said at least one character read;
   (c) responsive to a determination that at least one character other than said at least one readable character of said serial code cannot be read identifying the note by using the at least one readable character and the respective field position of said at least one readable character, wherein the position of the at least one readable character is not known prior to reading the at least one readable character; and
   wherein the position is correlated to account information when the note is deposited.

6. The method of claim 5 wherein the serial code characters are identified using an optical character recognition device.

7. A method for correlating a partially read serial code to a note, comprising the steps of:
   (a) reading at least one character of a serial code;
   (b) identifying the field position of at least one character read;
   (c) responsive to a determination that at least one unreadable character other than said at least one readable character of said serial code cannot be read wherein the field positions of the at least one readable character and the at least one unreadable character are not known prior to reading the at least one character of the serial code, comparing said at least one readable character and said respective field position with said complete serial code, wherein if said complete serial code contains said at least one readable character in said field position, then said partially read serial code correlates with said complete serial code; and
   (d) identifying the note by its position in a stack of notes.

8. A method for correlating a partially read serial code to a note, comprising the steps of:
   (a) reading at least one character of a serial code;
   (b) identifying the field position of at least one character read;
   (c) responsive to a determination that at least one unreadable character other than said at least one readable character of said serial code cannot be read wherein the field positions of the at least one readable character and the at least one unreadable character are not known prior to reading the at least one character of the serial code, comparing said at least one readable character and said respective field position with said complete serial code, wherein if said complete serial code contains said at least one readable character in said field position, then said partially read serial code correlates with said complete serial code; and
   (d) identifying account data to the note when distributed.

9. A method for correlating a partially read serial code to a note comprising the steps of:
   (a) reading at least one character of a serial code;
   (b) identifying the field position of at least one character read;
   (c) responsive to a determination that at least one unreadable character other than said at least one readable character of said serial code cannot be read wherein the field positions of the at least one readable character and the at least one unreadable character are not known prior to reading the at least one character of the serial code, comparing said at least one readable character and said respective field position with said complete serial code, wherein if said complete serial code contains said at least one readable character in said field position, then said partially read serial code correlates with said complete serial code; and (d) identifying account data to the note when the note is deposited.

10. A method for identifying notes distributed from an automated teller machine wherein said notes each have a serial code that comprises a series of random characters having no mutual dependency, said method comprising the steps of:

(a) reading at least one readable character of a note's serial code;

(b) identifying a field position in the serial code of the at least one readable character, wherein the field position of the at least one readable character is not known prior to reading the at least one readable character;

(c) recording the field position and the character;

(d) correlating account data with the recorded character and field position data and identifying the note by its position in a stack of notes;

(e) comparing a complete serial code to said recorded character and field position data to determine if there is a match, wherein a match may be determined even though at least one character other than said at least one readable character of said serial code cannot be read.

11. The method as recited in claim 10, wherein the reading of step (a) and the identifying of step (b) occurs before the notes are installed in the automated teller machine.

12. The method as recited in claim 10, wherein the note is identified in step (c) by eliminating all serial codes not having said at least one character located in said field position.

* * * * *